United States Patent
Germuska

[15] 3,689,133
[45] Sept. 5, 1972

[54] OPTICAL SYSTEM HAVING LENS AND TWO MOVABLE MIRRORS

[72] Inventor: Richard W. Germuska, Cleveland, Ohio

[73] Assignee: Addressograph-Multigraph Corporation, Cleveland, Ohio

[22] Filed: May 18, 1970

[21] Appl. No.: 38,028

[52] U.S. Cl. .................... 350/202, 350/299, 355/57
[51] Int. Cl. ........................ G02b 7/18, G02b 17/00
[58] Field of Search ............ 350/202, 203, 299, 305; 355/57, 60, 65, 66

[56] References Cited

UNITED STATES PATENTS

| | | | |
|---|---|---|---|
| 2,100,967 | 11/1937 | Levy | 350/202 X |
| 3,088,368 | 5/1963 | Tripp et al. | 350/202 X |
| 2,940,358 | 6/1960 | Rosenthal | 350/203 UX |
| 2,967,455 | 1/1961 | McCormack | 355/66 |
| 2,555,387 | 6/1951 | Zobel | 350/299 UX |
| 3,205,776 | 9/1965 | Wright et al. | 350/305 |

*Primary Examiner*—John K. Corbin
*Attorney*—Russell L. Root and Ray S. Pyle

[57] ABSTRACT

An optical system for photocopiers to project an image from an object plane to an image plane is provided. The optical system includes a lens system and a two-mirror reflecting system embodying two mirrors preset to a given angle. This mirror system is so mounted as to head the light path into a direction perpendicular to the image plane. The lens system is mounted with its optical axis perpendicular with the object plane. The mounting of the two mirrors is such to permit the mirror system to move as a unit on a path bisecting the angle formed by the intersection of the perpendiculars to the object plane and image plane. This allows a presetting of the mirrors outside the machine and a focusing of the system in the machine by changing the length of the optical path without changing the angle and location of the optical axis with respect to the image plane. Also, the lens system is movable along the optical axis to adjust size ratio of the projected image to the subject matter on the object plane. With this arrangement it is discovered that image size determination and refined focusing can be achieved by simple translatory adjustments of the lens and of the two-mirror system, without shifting the image location in the process.

6 Claims, 2 Drawing Figures

RICHARD W. GERMUSKA
INVENTOR
BY Ray S Pyle
ATTORNEY

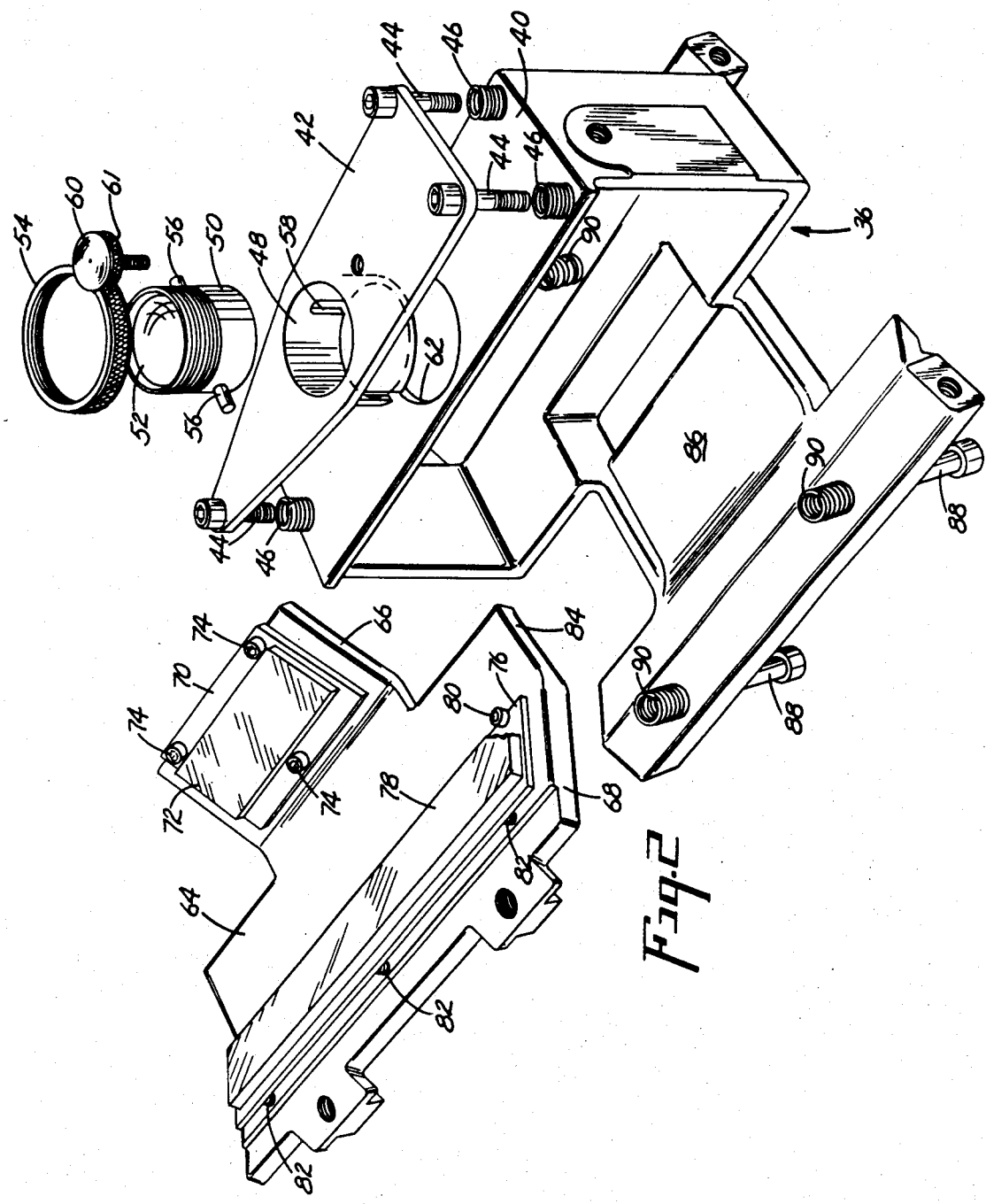

OPTICAL SYSTEM HAVING LENS AND TWO MOVABLE MIRRORS

BACKGROUND OF THE INVENTION

This invention relates generally to optical systems, and in the preferred embodiment to optical systems for reverse image lithographic master making. In the described embodiment, this system is employed in a photocopying machine for making reverse image masters and is thus described in detail in such an embodiment. However, it is to be understood that the invention is not so limited, but is useful in any optical system wherein an image can be projected from an object plane to an image plane by a two mirror bent path at one side or the other of the lens.

In the photocopying art, one common technique of photocopying documents is to pass the original document along an object plane past a sensing station and project the image thereon through an optical system to a sensitized master sheet driven past an exposure station on an image plane. In this type of photocopying, it is often necessary to utilize one or more mirrors in addition to the lens because of the relative position of the image plane of the exposure station with respect to the object plane of the scanning station.

In constructing and installing the optical systems in a production line assembly of photocopy machines, there are always certain inherent variations in the lens systems so that each optical system must be precisely aimed and focused after it is installed. As will be readily understood, such focusing requires movements of the components which are dependent upon one another. For example shifting the lens to give an image size change, changes the path length needed for proper focus so that a mirror may have to be shifted to give the correct path length and then may have to be reaimed due to the shift, requiring a reaiming and/or shift of the other mirror, etc., until some arrangement within acceptable limits is finally arrived at. In the operation of final focusing, the change of these mutually dependent variables independently with the parts mounted in the machine present a complex and time consuming operation requiring extreme skill to obtain acceptable adjustment of the optical system.

SUMMARY OF THE INVENTION

According to the present invention, an optical system for a photocopying machine using two mirrors and a lens, and a method of readily adjusting and focusing the same are provided. The optical system transmits light from an object at the object plane to an image plane, along a bent optical path. The mirrors are mounted and preset relative to each other externally of the machine to a given angle to form a mirror system. This mirror system is then placed in the machine and adjusted to a preselected angular position so that it will bend the optical path into approximate coincidence with the central axes of the object and image areas, perpendicular to the object and image planes, respectively. The mounting of the mirror system in the machine is also such that it can be moved with translatory movement along a line midway between these central axes. The movement along this line will change the length of the optical path to thereby focus the image on the image plane without changing the location or the angle of the optical path with respect to the central axis of the image plane or the object plane, and the focusing does not require changing of the mirror angles or mirror system angle once it is preset. Also, the lens is movable axially on its optical axis for precise adjustment of the size ratio of the original to the projected image.

DESCRIPTION OF THE DRAWINGS

FIG. 2 is a perspective exploded view of the optical system shown in FIG. 1.

DESCRIPTION OF THE PREFERRED EMBODIMENT

Figure 1:
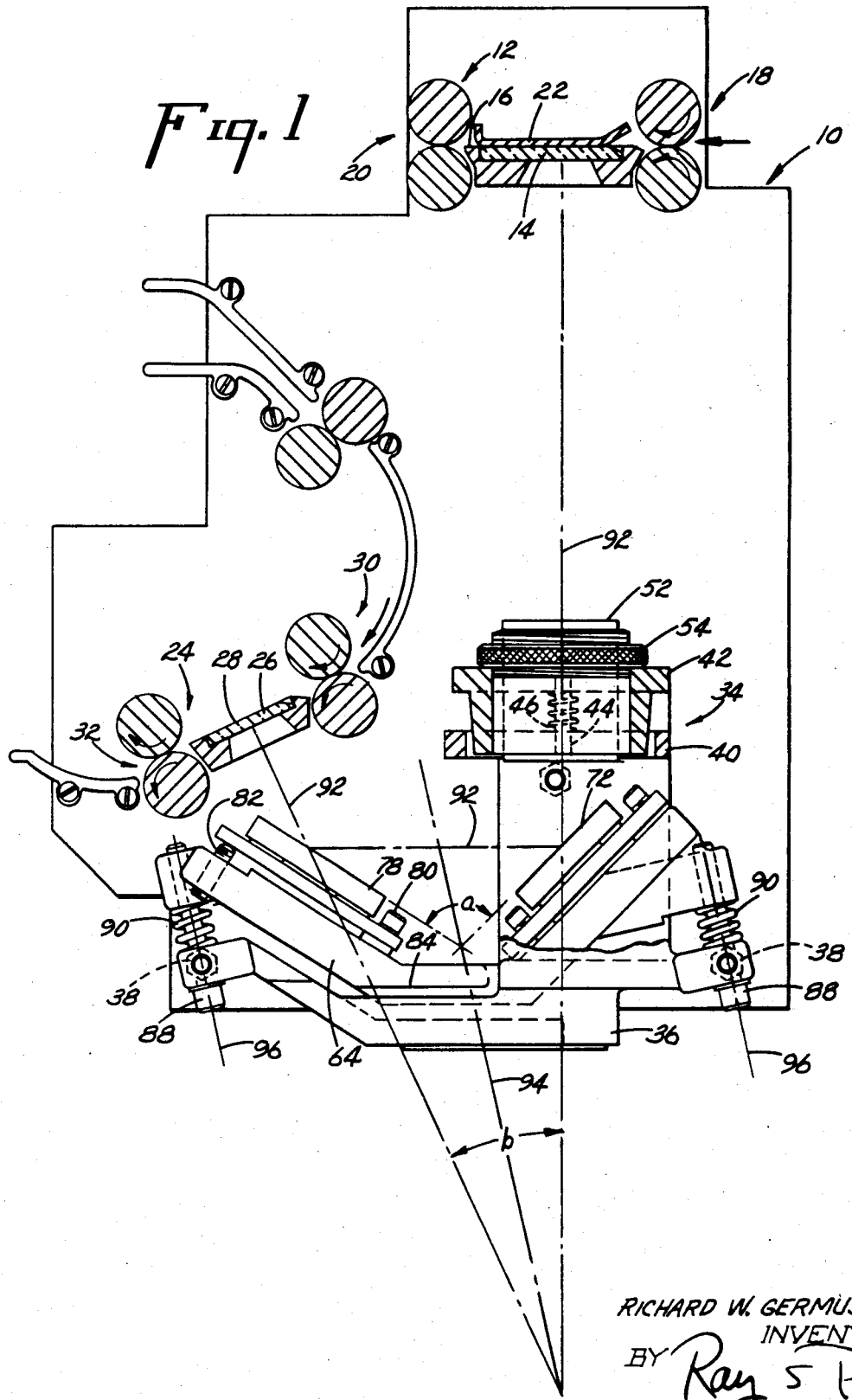
FIG. 1 is a sectional view somewhat diagrammatic, and with some unrelated parts omitted, of the scanning and exposure stations, and the optical system of a copier.

Referring now to the drawings, and for the present to FIG. 1, the photocopying section of the copy machine is shown. This section includes a structural frame designated generally as 10. Located at the top of the frame 10 is an illumination or scanning station designated generally as 12. The scanning station 12 includes a flat glass plate 14, the upper flat surface 16 thereof defining the object plane, a portion of which may be considered the illumination or object area which has a length equivalent to the width of the original document, and a narrow width as defined by the opening 14. A set of entrance rolls 18 and a set of exit rolls 20 are provided on opposite sides of the plate 14 and are disposed to drive an original document as represented by the arrow across the plate 14 for scanning and projecting of the scanned image. A backing plate 22 is also provided to maintain the original document in flat contact with the plate 14.

The frame 10 also supports a master exposure apparatus designated generally as 24. The master exposure apparatus 24 includes a flat glass plate 26 having an upper surface 28 thereof which defines the image plane having an exposure or image area corresponding generally to the shape and size of the object area. A set of master drive rolls 30 is provided on one side of a plate 26, and a second set of drive rolls 32 is provided on the opposite side of the plate 26. A sensitized master is driven by the drive roll sets 30 and 32 along the plate 26 as indicated by the arrow with its sensitized surface lying on the surface 28 where the image is projected through an optical system designated generally as 34.

The optical system 34 which is shown in section in FIG. 1, and in exploded perspective in FIG. 2, includes a primary support casting 36 which is secured to the frame 10 by means of bolts 38 passing through the frame and threaded into the casting. The location of these bolts 38 is relatively critical in order that the support casting 36 be accurately positioned when mounted into the machine.

The support casting 36 has an upper support table 40 which supports a lens plate 42. The lens plate 42 is mounted to the support table 40 by means of three triangularly spaced screws 44 threadably engaged into support table 40, with coil springs 46 surrounding each of the screws 44. The screws 44 are for adjusting the angular position of the optical axis of a lens, and the springs 46 urge the plate 42 always against the heads of the screws 44 and thus maintain the precise position to which it is adjusted.

The lens plate 42 has a central cylindrical bore 48 in which is disposed a lens tube 50 in which is mounted a lens system 52. An adjusting ring 54 is threaded onto the lens tube 50 to provide for axial movement of the lens tube 50 in the bore 48. The lens tube 50 also includes a pair of projecting pins 56 disposed to slide in slots 58 formed in the side of the bore 48. Thus, rotation of the adjusting ring 54 will cause axial movement of the lens tube 50 due to the pins 56 and slots 58 coacting to prevent rotational movement of the tube 50.

A clamping screw 60 is also provided which threads into the lens plate 42. The underside of the head 61 of the screw bears against the adjusting ring 54. When this is loosened, it allows the adjusting ring 54 to be turned, but when tightened down prevents turning of the adjusting ring 54.

In axial alignment with the bore 48 is an aperture 62 formed in the support table 40 to receive the lens tube 50 and allow the lens 52 to project an image therethrough.

A mirror support casting 64 is also provided which is adapted to support a pair of mirrors in the optical system. The mirror support casting 64 is generally U-shaped and with one arm forming a relatively narrow mirror mounting section 66. The mirror mounting section 66 has mounted thereto a mirror mounting pad 70 on which is mounted a reflecting mirror 72. The mirror mounting pad 70 is secured to the mounting section 66 by means of three screws 74 threaded through the pad 70 and into the mounting section 66. The other mirror mounting section 68 has secured thereto a second mirror mounting pad 76 on which is mounted a second reflecting mirror 78. The mirror mounting pad 76 is secured to the mounting section 68 by means of three screws along the lower edge thereof, one of which is shown in FIG. 2 and designated as 80. These screws pass through the mirror mounting pad 76 and threadably engage into the mounting section 68. Also provided are three mirror adjusting screws 82 which are threadably engaged through the mounting section 68 and abut against the under side of the mirror mounting pad 76. The operation of these mirror adjusting screws 82 allows the angle of the mirror 78 to be changed with respect to the angle of the mirror 72.

The mirror support casting 64 with the mirrors mounted therein is supported above the primary support casting 36 with the lower surface 84 of the mirror support casting 64 adjacent to and slightly above the surface 86 formed in the primary support casting 36. Three triangularly positioned mirror system adjusting screws 88 pass through the primary support casting 36 and threadably engage the mirror support casting 64. Coil springs 90 surround the adjusting screws 88 to support the mirror support casting 64 and maintain tension on the adjusting screws to hold the mirror in adjusted position. The mirror system adjusting screws 88 provide for both angular and translational adjustment of the mirror support casting 64 to thereby adjust the mirror system comprised of the two mirrors.

Referring to FIG. 1 a broken line 92 is used to represent the central axis of the object area portion, of the object plane 16, which axis is normal to the object plane. When the lens system 52 is installed it is so positioned (as hereinafter described) that it's optical axis is in line with this central axis 92. The central axis of the image area, perpendicular to the image plane 28 is designated by a broken line 92' which is coplanar with axis 92 and will intersect the line 92 at some point P. The angle between these central axes is designated by the reference character b. A broken line 94 is drawn so as to be at all points equidistant from the axes 92 and 92' (which normally, then, makes it the bisector of the angle b).

While the immediately foregoing paragraph and the subsequent description refer to 16 as the object plane and 28 as the image plane, it will be obvious to those versed in this art that these are interchangeable and so either orientation is to be considered in connection with application of the invention herein.

It will now be apparent that the light reflected from an object at the object plane 16 proceeds generally in the direction of the central axis 92 of the object area through lens system 52, is reflected by mirror 72 generally in the direction of a line 92'' to mirror 78 where it is again reflected in the general direction of central axis 92' to the image plane 28. As is well known, if the image and object are to be about equal in size, the effective center of the lens system will be substantially midway of the light path between the object plane and image plane, and this is the particular situation illustrated in the drawings, although the usefulness of the invention is not confined to arrangements providing such 1:1 imaging.

With respect to the adjustment of the optical system, reference is made to FIG. 1. For the best image projection, the optical path through the system so oriented as to coincide generally with the central axes perpendicular to both the object plane and the image plane, and focusing should not change either the angle or the positions thereof with respect to either of these planes.

This is accomplished as follows: The mirror support casting 64 is placed in an optical jig with the mirrors mounted thereon, and the mirror adjusting screws 82 are adjusted to give the desired precise angle designated as a in FIG. 1 which is predetermined in accordance with the particular machine layout. This angle a is so selected that when the mirror system is mounted on the support casting by threadably engaging it with the three screws 88, it can be adjusted by the screws 88 so that the optical path through the lens, when it is aligned with the central axis 92 of the object plane, will be bent to be aligned substantially with the central axis 92' perpendicular to the image plane. The positioning of the bolts 38 to support the casting 36 in the frame is sufficiently precise so that when the preset mirror system is inserted it will be properly oriented with respect to the central axes of the object area and the image area except for very minor adjustments which the screws 88 can readily accommodate. Also, the two screws 88 associated with the left side of the casting 84 can be used to rock the casting very slightly about an axis in the plane of the drawing (FIG. 1) and thereby bring the image into precise parallelism with the image plane. When the casting 36 has been mounted in the frame 10, the lens system 52 carried by the lens plate can then be adjusted by adjusting screws 44 to position the optical axis of the lens 52 to be perpendicular to the object plane and thus substantially coincident with central axis 92 of the object area.

When this is done, the optical system has then been positioned with the optical axis of the lens being perpendicular to the object plane and image plane.

However, commercial grade lenses can not be produced at reasonable cost so as to have identical focal lengths. For this reason, the length of the optical path from the object to the image plane must be varied slightly to obtain optimum sharpness of focus. This movement can be quite easily performed with the optical system of the present invention without changing the angle of the light path nor the location thereof with respect to the image plane which have been precisely preset. This is accomplished by moving the mirror system, i.e., the two mirrors, bodily, i.e., with translatory motion, along a path which is precisely midway between the central axes 92 and 92' or, in the form shown, along the bisector 94 of the angle $b$. As is apparent from FIG. 1, the bisector 94 passes through the apex of the angle $a$. In addition, the planes normal to the mirrors 72, 78 at the points of incidence of the optical axis 92'' intersect on the bisector 94. Because of this relationship, the planes of the two mirrors 72, 78 and the two normal planes, in effect, form a quadrilateral with optical axis 92'' interconnecting two opposite corners and bisector 94 interconnecting the other two corners of the quadrilateral. In order to move the mirror system, the mirror support casting 64 is moved on this path 94, by means of the three mirror system adjusting screws 88. These screws are so positioned with respect to the castings 36 and 64 that their center lines designated by the lines 96 are parallel to the line 94. Thus, uniform movement of these screws 88 will cause the mirror support casting to move with translatory motion parallel to the path 94 which will change the length of the path on the optical axis 92 to thereby bring the image into focus at the image plane 28, but will not change the angle of the optical axis 92 with respect to the image plane, nor will it change the location of the image on the image plane.

If the size of the projected image is unimportant, i.e., if the ratio of the size of the image projected to the size of the image on the object plane is not important, the focusing adjustment by movement of the casting 64 along the path 94 is all that is required. However, if a definite ratio of the size of the object on the object plane to the size of the image projected on the image plane is desired, this can be controlled by moving the lens system 52 along line 92. (Usually with photocopying machines, it is desired to project an image the same size as the object, and thus axial adjustment of the lens 52 will generally be required). Movement of the lens 52 along the axis 92 will act to change the size of the projected image so that the proper ratio between the projected image and the object can be maintained. Thus, by alternate axial adjustment of the lens system 52 and translatory adjustment of the casting 64, the image can be quickly brought into sharp focus at the image plane with the desired image size.

From the foregoing description it is apparent that the present invention concerns itself with the arrangement of an optical system embodying a lens system and a mirror system consisting of two mirrors in the optical path at one side of the lens system, and the invention manifests itself in the particular way in which the mirror system is moved to achieve greatly simplified size and/or focus adjustment.

In summary, it can be seen that the system of the present invention provides a relatively simple optical system and method of focusing it. The mirrors in the system are preset to an optimum precise angle with respect to each other and then are adjusted as a unit for proper orientation with the optical axis before the system is inserted in the machine. This allows easy precise adjustment on special precision equipment. These adjustments need not be changed after the system is installed as a unit in the machine. The necessary focusing can be performed after the system is inserted by simply moving the mirror system as a whole along a predetermined path. Also, the lens system can easily be adjusted in the machine for alignment of the optical axis and size of image.

What is claimed is:

1. An optical system for projecting an image from an area in an object plane to an image area in an image plane with the two planes being non-parallel and in which each area has a central axis perpendicular thereto, the axes being coplanar and intersecting to define an acute angle therebetween, comprising:
    a lens system having an optical axis;
    said lens system having mounting means disposed to adjust the optical axis thereof to a position coincident with the central axis of one of said areas and to shift the lens system along its optical axis to provide for focusing;
    a mirror system having two reflecting mirror means;
    means to mount said mirror system on a carriage with said two mirror means being angularly related to form a preselected angle therebetween;
    means for so mounting said carriage to that side of said lens system which is opposite to the side in direct optical communication with said one area, that a first one of said reflecting mirror means intercepts the optical axis of said lens system and directs light between the lens system and the second one of said reflecting mirror means while said second mirror means directs light between said first mirror means and the other of said areas, generally symmetrically with relation to its central axis;
    said mounting means mounting said carriage such that a plane bisecting the angle formed by the perpendiculars of the image plane and the object plane passes through the apex of the preselected angle formed by said two reflecting mirror means;
    said mounting means including means to move said carriage with translatory motion along the plane of the bisector of the angle formed by the perpendiculars of the image plane and the object plane thereby to bring the image into focus without shifting the image on the image plane.
2. The optical system of claim 1 wherein said two reflecting mirror means comprises two plane mirrors.
3. The optical system of claim 2 wherein planes normal to each of said mirrors at their respective points of incidence intersect in the bisector plane,
    said normal planes and the planes of said mirrors defining a quadrilateral with said bisector plane passing through opposite corners thereof,
    the movement of said carriage causing the position of the quadrilateral to shift while maintaining said bisector plane passing through said opposite corners.

4. The optical system of claim 1 wherein said mirror system includes means for adjusting the preselected angle formed by said two reflecting mirror means.

5. The optical system of claim 1 wherein said means for mounting said carriage includes support means for said lens system with said carriage being supported on said support means and movable relative to said lens system.

6. A method of installing and focusing a lens and mirror system in a copier for projecting an image from an area in an object plane to an image area in an image plane with the two planes being non-parallel and in which each area has a central axis perpendicular thereto, the axes being coplanar and intersecting to define an acute angle therebetween, said method comprising the steps of:

providing a lens system;

positioning said lens system in the copier with the optical axis thereof normal to the object plane;

providing a mirror system having two reflecting mirror means;

mounting the two reflecting mirror means on a common carriage and, prior to installing the carriage in the copier, adjusting the angular relationship between said two reflecting mirror means to form a preselected angle;

installing the carriage mounting the two reflecting mirror means in the copier in a position such that a first one of said reflecting mirror means intercepts the optical axis of the lens system and cooperates with said second reflecting mirror means to bend said optical axis to a plane normal to the image plane and with the position of said mirror system in the copier being such that a plane dividing the angle formed by the perpendiculars to the image and object planes passes through the apex of said preselected angle formed by said two reflecting mirror means; and shifting said carriage with translatory motion along said divider plane to the position of optimum resolution of the image without displacing the image along the image plane.

* * * * *